United States Patent
Müller et al.

(10) Patent No.: US 11,828,632 B2
(45) Date of Patent: Nov. 28, 2023

(54) ULTRASONIC SENSOR ARRANGEMENT FOR FLOW MEASUREMENTS HAVING A COUPLING ELEMENT

(71) Applicant: Sensus Spectrum LLC, Morrisville, NC (US)

(72) Inventors: Frank Müller, Ronnenberg (DE); Andreas Pfeiffer, Hannover (DE)

(73) Assignee: Sensus Spectrum LLC, Morrisville, NC (US)

( * ) Notice: Subject to any disclaimer, the term of this patent is extended or adjusted under 35 U.S.C. 154(b) by 325 days.

(21) Appl. No.: 17/254,332

(22) PCT Filed: Jun. 25, 2019

(86) PCT No.: PCT/EP2019/066796
§ 371 (c)(1),
(2) Date: Dec. 21, 2020

(87) PCT Pub. No.: WO2020/002311
PCT Pub. Date: Jan. 2, 2020

(65) Prior Publication Data
US 2021/0270648 A1   Sep. 2, 2021

(30) Foreign Application Priority Data

Jun. 27, 2018  (EP) .................................... 18180016
Oct. 25, 2018  (DE) .................... 10 2018 126 610.3

(51) Int. Cl.
*G01F 1/66*  (2022.01)

(52) U.S. Cl.
CPC .................... *G01F 1/662* (2013.01)

(58) Field of Classification Search
None
See application file for complete search history.

(56) References Cited

U.S. PATENT DOCUMENTS

| | | | | |
|---|---|---|---|---|
| 4,213,667 A * | 7/1980 | Wittes | ................... | H01R 13/595 439/469 |
| 7,614,309 B2 * | 11/2009 | Rieder | .................... | G01F 1/662 73/861.27 |
| 2005/0066745 A1 * | 3/2005 | Wiest | ...................... | G01F 1/667 73/861.27 |
| 2013/0047743 A1 * | 2/2013 | Sonnenberg | ............ | G01F 1/662 73/861.18 |

(Continued)

FOREIGN PATENT DOCUMENTS

| | | |
|---|---|---|
| DE | 102015004049 | 9/2016 |
| GB | 2572802 | 10/2019 |
| WO | WO2018011372 | 1/2018 |

*Primary Examiner* — Harshad R Patel
(74) *Attorney, Agent, or Firm* — McHale & Slavin, P.A.

(57) ABSTRACT

An ultrasonic sensor arrangement. The ultrasonic sensor arrangement may comprise a housing with a container which is open at the top, a disc-shaped, piezoelectric element and a coupling element in the interior of the container, wherein the coupling element has a bearing surface, on which the piezoelectric element is arranged, and is provided on the underside of the container, wherein the container and the coupling element are integrally formed, and wherein at least the piezoelectric element is covered with a potting compound, and to a measuring apparatus comprising such an ultrasonic sensor arrangement.

13 Claims, 3 Drawing Sheets

(56) References Cited

U.S. PATENT DOCUMENTS

2016/0103005 A1\* 4/2016 Wiest ................. G01F 1/662
                                                            73/861.27
2017/0132997 A1\* 5/2017 Wiest ................. G10K 9/122
2019/0226893 A1\* 7/2019 Kuhlemann ........... G01F 1/662

\* cited by examiner

US 11,828,632 B2

ULTRASONIC SENSOR ARRANGEMENT FOR FLOW MEASUREMENTS HAVING A COUPLING ELEMENT

CROSS REFERENCE TO RELATED APPLICATIONS

This is a national stage filing in accordance with 35 U.S.C. § 371 of PCT/EP2019/066796, filed Jun. 25, 2019, which claims the benefit of the priority of European Patent Application No. 18180016.0, filed Jun. 27, 2018 and German Patent Application No. 102018126610.3, filed Oct. 25, 2018, the contents of each are incorporated herein by reference.

TECHNICAL FIELD

The present description relates to an ultrasonic sensor arrangement, and a measuring apparatus for determining the flow rate of a fluid which flows through a pipe portion, the apparatus comprising such an ultrasonic sensor arrangement.

BACKGROUND ART

In one type of measuring method, ultrasonic sensors are used to determine the flow rate of a fluid which flows through a pipe portion. An ultrasonic sensor couples acoustic signals into the fluid and an ultrasonic receiver picks up the signal at the end of a predetermined path of the signal. The flow rate of a flowing fluid through the measuring pipe can be determined, with knowledge of the measuring pipe geometry, from the measured time of flight of the signal compared to a measured time of flight of a signal in a state in which the fluid in the measuring pipe does not flow. This method for determining the flow rate of the fluid which flows through a pipe portion is known as a time of flight difference method.

A distinction is made substantially between two options for coupling ultrasonic signals into the measuring pipe or the fluid. In a measuring method or in the measuring apparatus used for this purpose, the ultrasonic sensors are fastened to the outer side of the measuring pipe such that the ultrasound is guided through the pipe wall. This arrangement of the ultrasonic sensor on the measuring pipe is known as a clamp-on arrangement.

In another structure of a measuring apparatus, openings are provided in the pipe wall of the measuring pipe, in said openings the ultrasonic sensors are arranged such that the sound from the ultrasonic sensors can be coupled directly into the fluid. This avoids the passage of sound through the pipe wall of the measuring pipe.

Since an acoustic signal can be broken and damped when passing through a pipe wall, it is advantageous with regard to the quality of the measurement signal to couple the acoustic signal directly into the fluid.

With this type of ultrasonic coupling, in which the acoustic signal is coupled directly from the ultrasonic sensor into the fluid, there are particular requirements for the ultrasonic sensor, in particular for fastening the ultrasonic transducer in the measuring pipe. It must be ensured that the ultrasonic sensor sits in the measuring pipe in a fluid-tight manner. The means generating the ultrasound, such as a piezoelectric element, and the electrical supply connected thereto must be protected from the fluid which flows in the measuring pipe. Furthermore, it must be ensured that the ultrasonic sensor permanently maintains the position in the measuring pipe that is metrologically predetermined. In contrast to the ultrasonic sensors mounted on the measuring pipe, the fluid which flows through the measuring pipe acts directly on the ultrasonic sensor in this arrangement such that high pressures in the measuring pipe can cause the ultrasonic sensor to be pushed out of its position in the measuring pipe. An incorrectly aligned ultrasonic sensor leads to incorrect measurement results.

When mounting the ultrasonic sensor, care must also be taken that the ultrasonic sensor, in particular the coupling element, is not installed in a squashed manner, since compression of the coupling element influences the acoustic properties of the coupling element and, in extreme cases, even damages the coupling element or the ultrasonic sensor.

Some measuring apparatuses for determining the flow rate using ultrasonic sensors are used in open terrain such that the measuring apparatuses including the ultrasonic sensors are exposed to fluctuating ambient conditions and moisture or even water. Large temperature differences paired with the moisture acting on the ultrasonic sensor from outside can lead to the ultrasonic sensors no longer working properly, and in extreme cases even failing.

DISCLOSURE OF INVENTION

The object of the present invention is that of providing an ultrasonic sensor arrangement which is easy to assemble, has the required tightness in the measuring pipe and delivers precise measurement results even when used under fluctuating ambient conditions and/or humidity.

According to the invention, the object is achieved by an ultrasonic sensor arrangement comprising a housing with a container which is open at the top, a disc-shaped, piezoelectric element and a coupling element in the interior of the container, wherein the coupling element has a bearing surface, on which the piezoelectric element is arranged, and is provided on the underside of the container, wherein the container and the coupling element are integrally formed, and wherein at least the piezoelectric element is covered with a potting compound.

The integral design of the container and the coupling element allows the ultrasonic sensor arrangement to be installed easily and ensures uniform thermal expansion of the material under the influence of higher temperatures such that no, or hardly any, material stresses, which affect the acoustic properties of the coupling element, occur in the interior of the ultrasonic sensor arrangement when the temperature changes. The potting compound protects at least the piezoelectric element from water and moisture in damp or wet ambient conditions.

In order to ensure during the manufacturing process that the piezoelectric element is completely covered with potting compound, it is advantageous that the bearing surface is surrounded at least in portions by a wall.

Piezoelectric elements are connected to electrical cables or electrical lines which have to be guided from the piezoelectric element out of the ultrasonic sensor arrangement. For the targeted guidance of the cables or electrical lines, slots which are open on one side, in particular slots which are open at the top, are advantageously provided in the wall. In a preferred embodiment, the width of the slots is selected such that the electrical cables or electrical lines are clamped. This prevents the electrical cables or electrical lines from floating when the potting compound is poured in.

In a preferred embodiment, spacers are provided on the bearing surface such that a cavity is created between the piezoelectric element and the bearing surface, into which a uniform adhesive layer can be introduced.

The spacers are preferably designed such that the piezoelectric element and the bearing surface are aligned in parallel with one another. The distance between the piezoelectric element and the coupling element and the parallel alignment of the piezoelectric element in relation to the bearing surface of the coupling element prevent material stresses due to temperature fluctuations from acting unevenly on the piezoelectric element and the coupling element. Comparable measurement results can thus be obtained over a comparatively large temperature range.

In a preferred embodiment, the coupling element is wedge-shaped. This offers the possibility of an oblique coupling of the acoustic signal into the measuring pipe.

It is advantageous that the coupling element and/or the potting compound are made from a transparent material. Material defects in the manufacturing process can be easily identified in a transparent material.

To avoid tension on the electrical lines of a piezoelectric element, it is advantageous that the housing has a housing wall and a cavity is provided between the coupling element and the housing wall. An excess length of an electrical line can be deposited in this cavity as length compensation.

This cavity is preferably also filled with potting compound such that, according to a preferred embodiment, the entire container is filled with potting compound in order to provide a sufficiently fluid-tight ultrasonic sensor arrangement.

In a preferred embodiment, the housing has a circumferential edge which is outwardly offset on the upper side of the container. The underside of the circumferential edge serves as a contact surface for the ultrasonic sensor arrangement on the measuring pipe.

Since the components, such as measuring pipes, in which the ultrasonic sensor arrangement is intended to be inserted, often have dimensional fluctuations, it is advantageous that the ultrasonic sensor arrangement has a tolerance compensation element in order to compensate for the dimensional fluctuations. As a result, the ultrasonic sensor arrangement abuts the measuring pipe without clearance and preferably without pressure.

The tolerance compensation element can preferably be inserted in an accommodation provided on the outer side of the housing. If the accommodation is located, for example, on the underside of the circumferential edge, the ultrasonic sensor arrangement abuts the measuring pipe in a floating manner. In a floating manner here means that the ultrasonic sensor is received in the measuring pipe without clearance, but no, possibly only slight, pressure forces act on the ultrasonic sensor arrangement, in particular on the container and the coupling element.

Furthermore, it is advantageous that the housing has ribs which point axially outward on its upper side. These ribs serve as cable guides to ensure that the cables leading to the outside do not inadvertently get into the container when the potting compound is poured in. This ensures that the container is fluid-tight by means of the potting compound.

In order to seal the ultrasonic sensor arrangement against a measuring pipe, a seal is provided, which is arranged on the outer side of the housing, in particular the container.

In order to prevent damage to the electrical cables or electrical lines arranged in the interior of the ultrasonic sensors during operation, a cable strain relief means is provided.

The present invention also relates to a measuring apparatus for determining the flow rate of a fluid which flows through a pipe portion, comprising a measuring pipe with a pipe wall, in which an opening is provided, and an ultrasonic sensor arrangement according to any of the preceding claims, wherein the ultrasonic sensor arrangement is arranged in the opening.

In particular when screwing ultrasonic sensor arrangements into powder-coated metal pipes, there is a risk that the coating will be damaged which can lead to corrosion at the damaged points in humid environments. The opening is therefore preferably thread-free such that powder-coated metal pipes can also be used as measuring pipes in damp environments.

Alternatively, in a preferred development, a holding apparatus can be provided for securing the ultrasonic sensor arrangement.

BRIEF DESCRIPTION OF DRAWINGS

Preferred embodiments are explained in more detail with reference to the accompanying drawings, wherein.

BEST MODE FOR CARRYING OUT THE INVENTION

Figure 1:
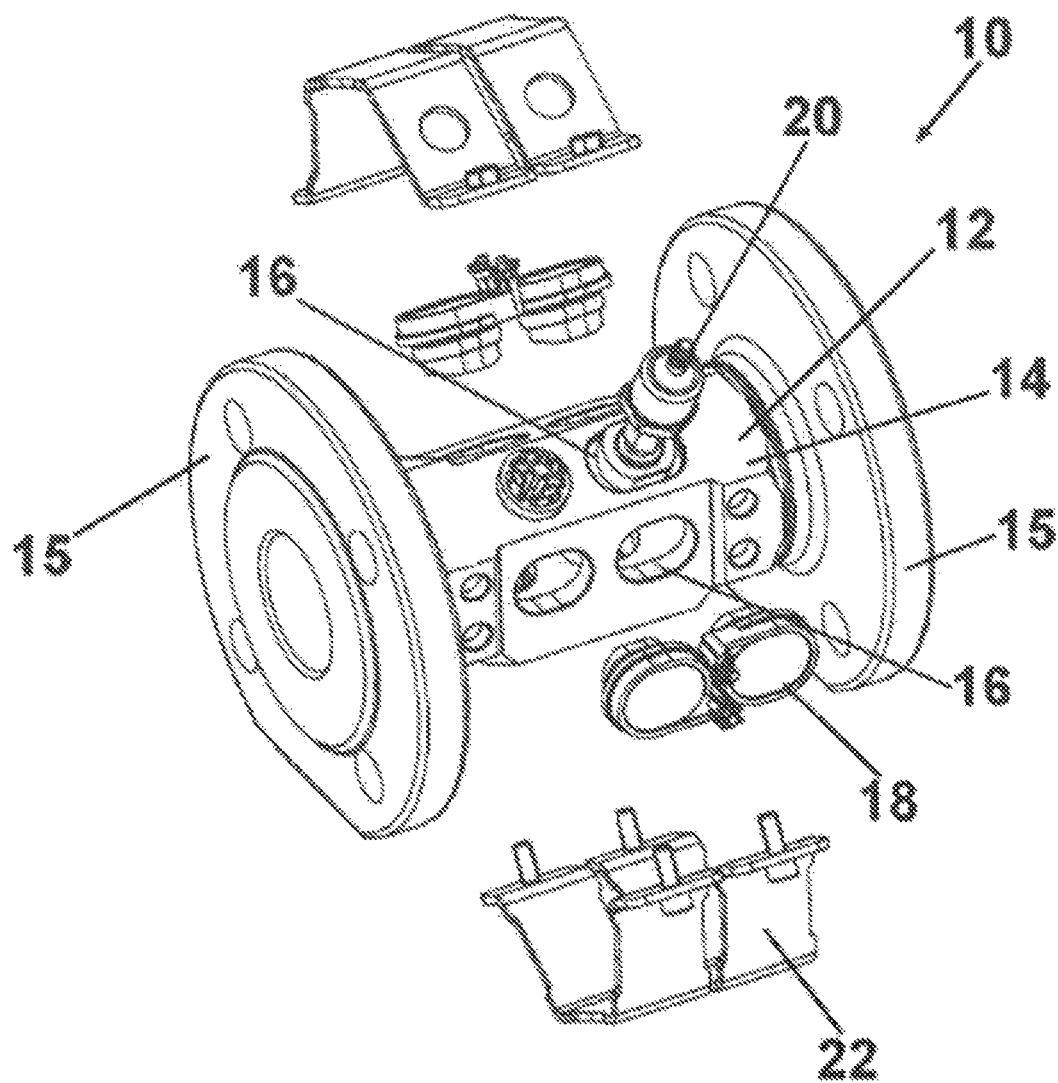
FIG. 1 shows a perspective view of an exploded measuring apparatus.

FIG. 1 shows a measuring apparatus 10 for determining the flow rate of a fluid which flows through a pipe portion in an exploded view. The measuring apparatus 10 comprises a measuring pipe 12 with a pipe wall 14. Flanges 15 for installation in a pipe system are provided on both sides of the measuring pipe 12. There are openings 16 in the measuring pipe 12, in each of which openings an ultrasonic sensor arrangement 18 or a measuring sensor 20 can be placed.

Figure 2:
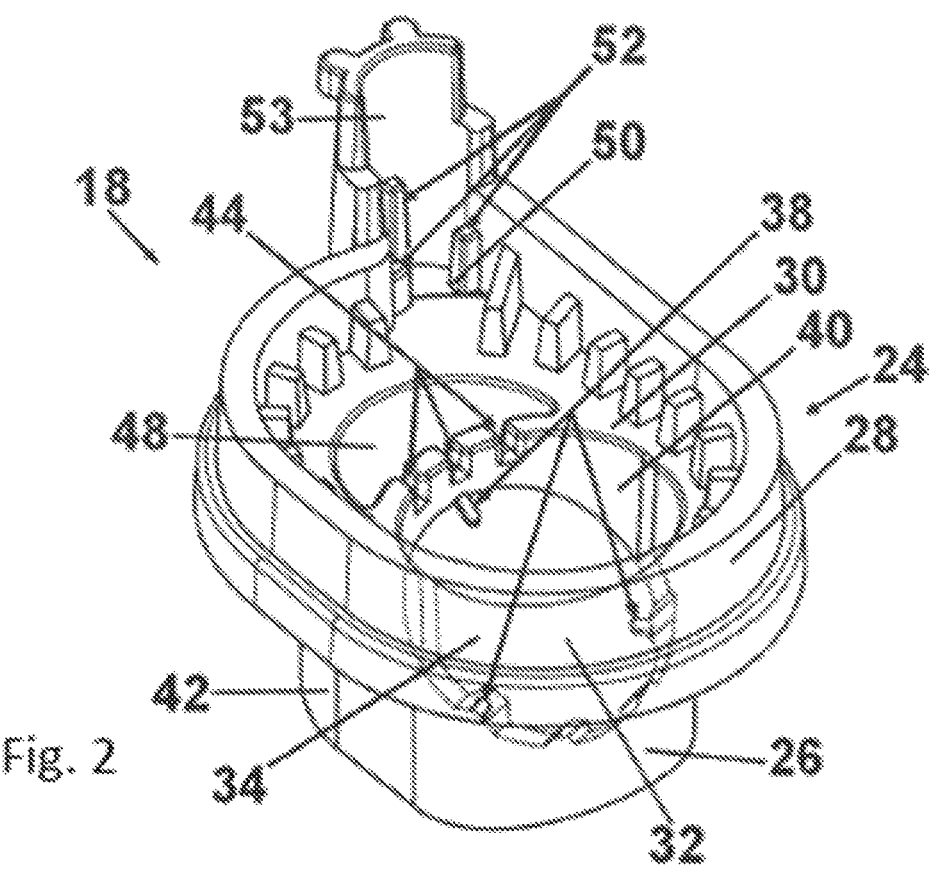
FIG. 2 shows part of an ultrasonic sensor arrangement in perspective view.

Furthermore, holding elements 22 are provided outside the measuring pipe 12 in order to secure the ultrasonic sensor arrangements 18 in their positions, FIG. 2 shows part of an ultrasonic sensor arrangement 18 in perspective view.

The ultrasonic sensor arrangement 18 comprises a housing 24 with a container 26 and a circumferential edge 28, wherein the container 26 has an open upper side 30 and the circumferential edge 28 is integrally fastened to the container 26 on the upper side 30 of container 26 such that it is outwardly offset.

Furthermore, a wedge-shaped coupling element 32 is provided, wherein the coupling element 32 and the container 26 are integrally formed. The coupling element 32 is provided in the lower portion of the container 26 such that it substantially forms the underside of the container 26.

The container 26, the circumferential edge 28 and the coupling element 32 are integrally made from the same material.

The upper side of the coupling element 32 is designed as a bearing surface 34 for a piezoelectric element 36. The piezoelectric element 36 is designed as a round disc and is glued to the coupling element 32.

In order to be able to apply a uniform adhesive layer between the piezoelectric element 36 and the coupling element 32, spacers 38 are provided on the outer edge of the bearing surface 34, The spacers 38, made of the same material as the coupling element, are designed as finger-like protrusions with a flat surface, protrude radially inward from the outer edge of the bearing surface 34 and are designed such that the distance between the piezoelectric element 36 and the coupling element 32 is parallel when the disc-shaped piezoelectric element 36 abuts the bearing surface 34.

The bearing surface 34 is circular, with lateral walls 40 projecting upward on the outer side of the bearing surface 34. The lateral walls 40 are partly formed by the container wall 42 here. Slots 44 are incorporated in the lateral walls 40 in order to guide an electrical line 46, which is connected to the piezoelectric element 36, to the outside. The slots 44 are open at the top and have, at least in portions, a passage width that is slightly smaller than the diameter of the electrical line 46 in order to be able to clamp the electrical line 46 in the slots 44. A plurality of slots 44 is provided in order to optionally clamp a plurality of electrical lines 46 in place.

A cavity 48 is provided between the container wall 42 and the coupling element 32. This cavity 48 is used, as can be seen in FIG. 3, to receive the electrical line 46 of the piezoelectric element 36 in portions.

In the circumferential edge 28, a passage 50 is provided, in which cable guide ribs 52 are arranged. A cable guide wall 53 is also provided at the passage 50, and to said wall a cable strain relief means 54 is attached. The cable strain relief means 54 is designed as a crimp connection.

Figure 3:
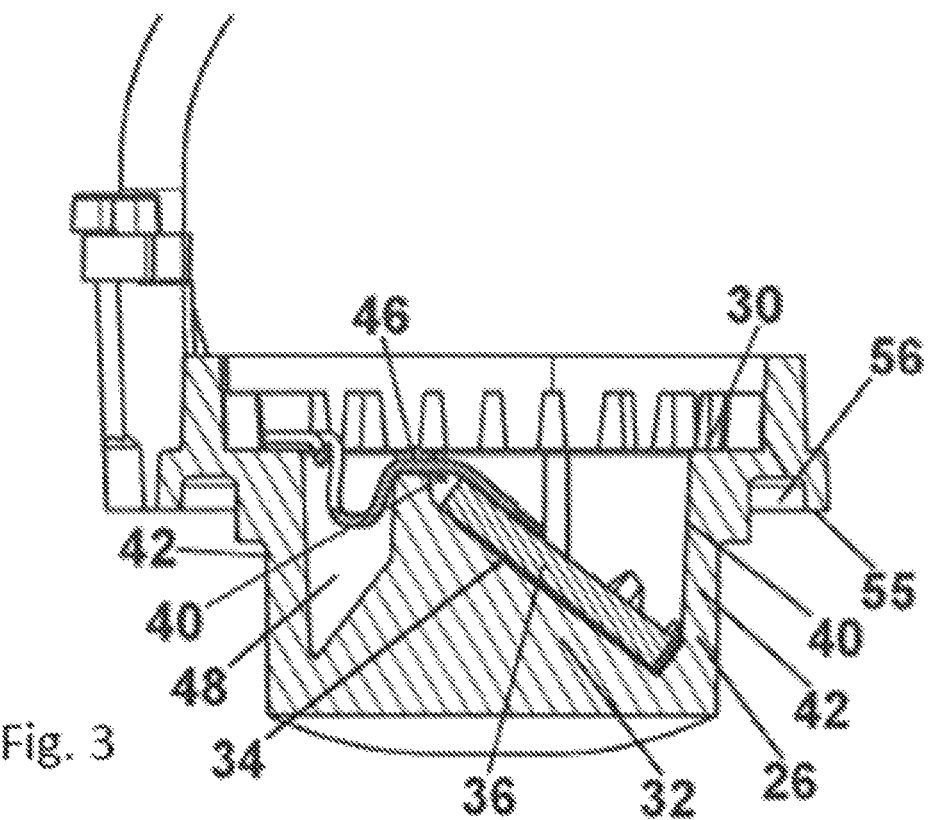
FIG. 3 shows a cross section through the ultrasonic sensor arrangement as produced.
Figure 5:
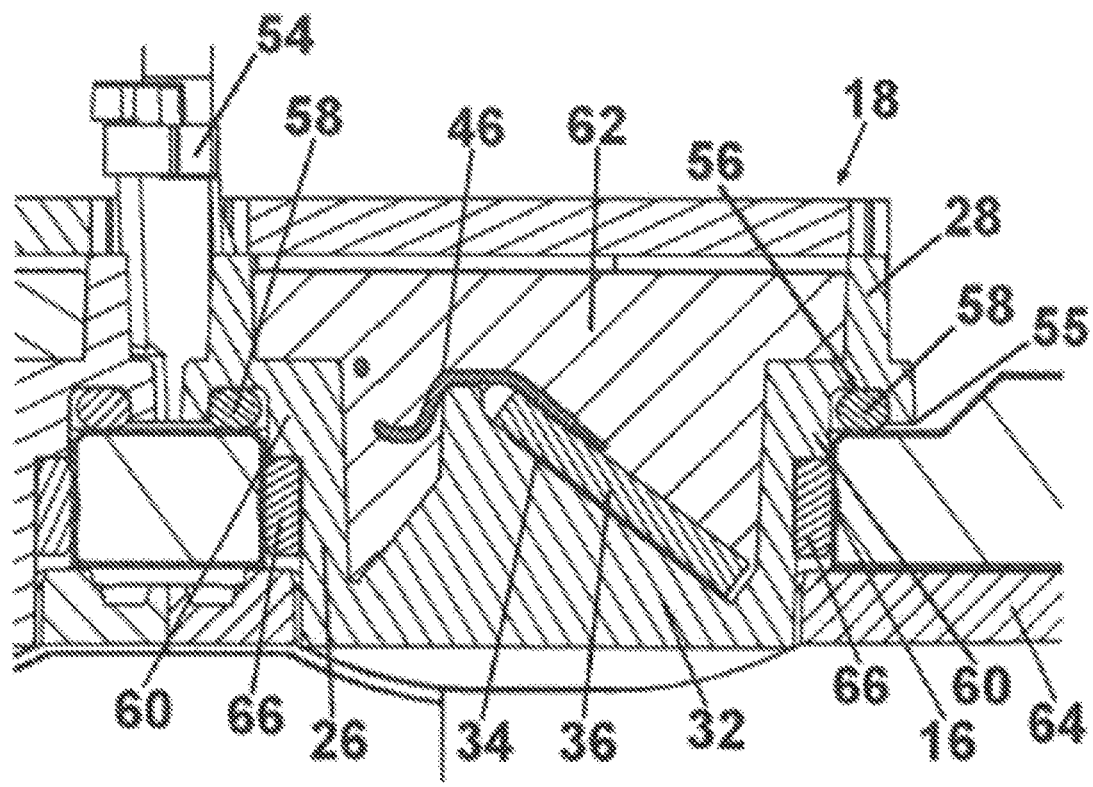
FIG. 5 shows a cross section through an ultrasonic sensor arrangement in a measuring apparatus for determining the flow rate of a fluid which flows through a pipe portion.

An accommodation 56 for a tolerance compensation element 58 is provided on the underside 55 of the peripheral edge 28 (see FIGS. 3 and 5). The accommodation 56 for the tolerance compensation element 58 extends as an annular groove along the outer circumference of the outwardly offset edge 28. The tolerance compensation element 58 is designed as an elastic ring-shaped band.

A protrusion 60 is provided in the outer wall of the housing between the underside of the container 26 and the circumferential edge 28.

Figure 4:
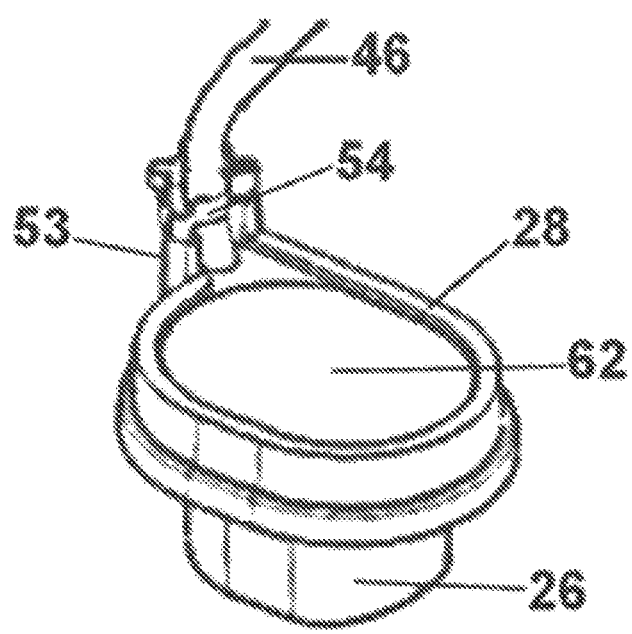
FIG. 4 shows a ready-to-use ultrasonic sensor arrangement in perspective view.

As can be seen in FIG. 4, the interior of the container 26 and part of the cavity formed by the circumferential edge 28 are filled with a potting compound 62. The electrical line 46 is guided to the outside at the passage 50 of the peripheral edge 28 and is connected to the cable strain relief means 54.

The potting compound 62 is, for example, silicone, preferably transparent silicone. Alternatively, any type of pottable plastic material can be used.

The coupling element 32 is preferably also made of a transparent material in order to be able to identify material irregularities such as air bubbles or inclusions which influence the acoustic properties of the coupling element 32. For example, the coupling element 32 can be made from PSU, PEEK, PPS, LOP, PEI, PPSU or polysulfone. Any material which has the required acoustic properties for use as a coupling element and is fluid-tight or at least sufficiently fluid-tight to protect the piezoelectric element 36 from the influence of water, for example, is suitable.

In producing the coupling element 32, the housing 24 is manufactured first with the circumferential edge 28 as an integral component. An adhesive layer is then applied to the bearing surface 34 and the piezoelectric element 36 is fastened to the coupling element 32. The electrical line 46 leading to the coupling element 32 is clamped between the slots 44 and guided into the cavity 48. From there, the electrical line 46 is guided to the passage 50 and positioned by means of the cable guide ribs 52 and secured to the cable guide wall 53 using a cable strain relief means 54. The potting compound is then poured into the housing 24. The potting compound 62 covers the piezoelectric element 36 and fills the cavity 48 with the electrical line 46 located therein such that the container 26 is completely filled with potting compound 62. Part of the cavity formed by the circumferential edge 28 is also filled with the potting compound 62.

FIG. 5 shows the installation of an ultrasonic sensor arrangement 18 in a measuring pipe 12 with an inner pipe 64. The measuring pipe 12 has an opening 16 in which the ultrasonic sensor arrangement 18 is arranged. The opening 16 of the measuring pipe 12 is thread-free such that the ultrasonic sensor arrangement 18 is plugged into the opening 16 of the measuring pipe 12. As shown in FIG. 1, holding elements 22 which are arranged above the ultrasonic sensor arrangement 18 are provided.

The underside 55 of the circumferential edge 28 rests on the measuring pipe 12 by means of the tolerance compensation element 58. The tolerance compensation element 58 is received in the accommodation 56 which is designed as a groove, wherein the tolerance compensation element 58 has a larger diameter than the depth of the groove such that the tolerance compensation element 58 protrudes outward over the underside 55 of the circumferential edge 28. The underside of the circumferential edge 28 is arranged with clearance or a small distance above the measuring pipe, while the tolerance compensation element 58 rests directly on the measuring pipe 12 and forms a connection without clearance. As a result, the ultrasonic sensor arrangement 18 is held in the opening 16 of the measuring pipe 12 substantially without pressure or without force even in the case of measuring pipes with manufacturing-related dimensional tolerances.

A sealing ring 66, which is arranged below the protrusion 60, is provided in the opening 16 between the housing 24 and the measuring pipe 12. The sealing ring 66 ensures that there is a sealed connection between the measuring pipe 12 and the ultrasonic sensor arrangement 18.

The underside of the housing 24 is adapted to the geometry of the measuring pipe 12 and the inner pipe 64 such that the ultrasonic sensor arrangement 18 in the interior of the measuring pipe 12 is aligned so as to be flush with the inner wall of the inner pipe 64.

In one embodiment (not shown), the inner pipe 64 is omitted. In this case, the ultrasonic sensor arrangement 18 in the interior of the measuring pipe. is formed so as to be flush with the measuring pipe 12

The described ultrasonic sensor arrangement 18 is designed to be fluid-tight such that in particular the piezoelectric element 36 is protected from moisture or water due to environmental conditions. The integral design of the container 26, the circumferential edge 28 and the coupling element 32 ensures low stresses in the ultrasonic sensor arrangement 18 due to material-related expansions under the influence of heat. Due to the use of the tolerance compensation element 58 and the sealing ring 66, dimensional tolerances of the measuring pipe 12 are compensated for. Undesirable squashing of the ultrasonic sensor arrangement 18 into the opening 16 of the measuring pipe 12 is avoided. The ultrasonic sensor arrangement 18 can be installed in a measuring pipe 12 without clearance and substantially without pressure or forces.

In one embodiment (not shown), the coupling element can be designed as a pedestal in order to couple ultrasound perpendicularly to the flow direction of the fluid in a measuring pipe.

Instead of a round piezoelectric element, it is also possible to use piezoelectric elements having a different geometry. The piezoelectric element can thus also have an angular, in particular quadrangular, shape. In this case, the geometry of the bearing surface must be adapted to the shape of the piezoelectric element.

The invention claimed is:

1. An ultrasonic sensor arrangement comprising:
   a housing with a container which is open at the top, the housing having an outer side and a circumferential edge which is outwardly offset on an upper side of the container, the circumferential edge having an accommodation formed as a groove, the housing further provided with a seal on the outer side,
   a tolerance compensation element inserted in the accommodation,
   a disc-shaped, piezoelectric element, and
   a coupling element in the interior of the container, wherein the coupling element has a bearing surface, on which the piezoelectric element is arranged, and said coupling element forming an underside of the container,
   wherein the container and the coupling element are integrally formed, and wherein at least the piezoelectric element is covered with a potting compound,
   wherein the bearing surface is surrounded at least in portions by a wall and open slots are provided in the wall.

2. The ultrasonic sensor arrangement according to claim 1, wherein the open slots are open at the top.

3. The ultrasonic sensor arrangement according to claim 1, wherein spacers are provided on the bearing surface.

4. The ultrasonic sensor arrangement according to claim 1, wherein the coupling element is wedge-shaped.

5. The ultrasonic sensor arrangement according to claim 1, wherein the coupling element and/or the potting compound are made from a transparent material.

6. The ultrasonic sensor arrangement according to claim 1, wherein the container has a container wall and a cavity is provided between the coupling element and the container wall.

7. The ultrasonic sensor arrangement according to claim 1, wherein the container is filled with the potting compound.

8. The ultrasonic sensor arrangement according to claim 1, wherein the housing has ribs on its upper side which point axially outward.

9. The ultrasonic sensor arrangement according to claim 1, wherein a cable strain relief means is provided.

10. A measuring apparatus for determining the flow rate of a fluid which flows through a pipe portion, the apparatus comprising:
    a measuring pipe with a pipe wall, in which an opening is provided, and an ultrasonic sensor arrangement according to claim 1, wherein the ultrasonic sensor arrangement is arranged in the opening.

11. The measuring apparatus according to claim 10, wherein the opening is thread-free.

12. The measuring apparatus according to claim 11, wherein a holding apparatus is provided for securing the ultrasonic sensor arrangement.

13. The measuring apparatus according to claim 10, wherein a holding apparatus is provided for securing the ultrasonic sensor arrangement.

* * * * *